Patented June 25, 1929.

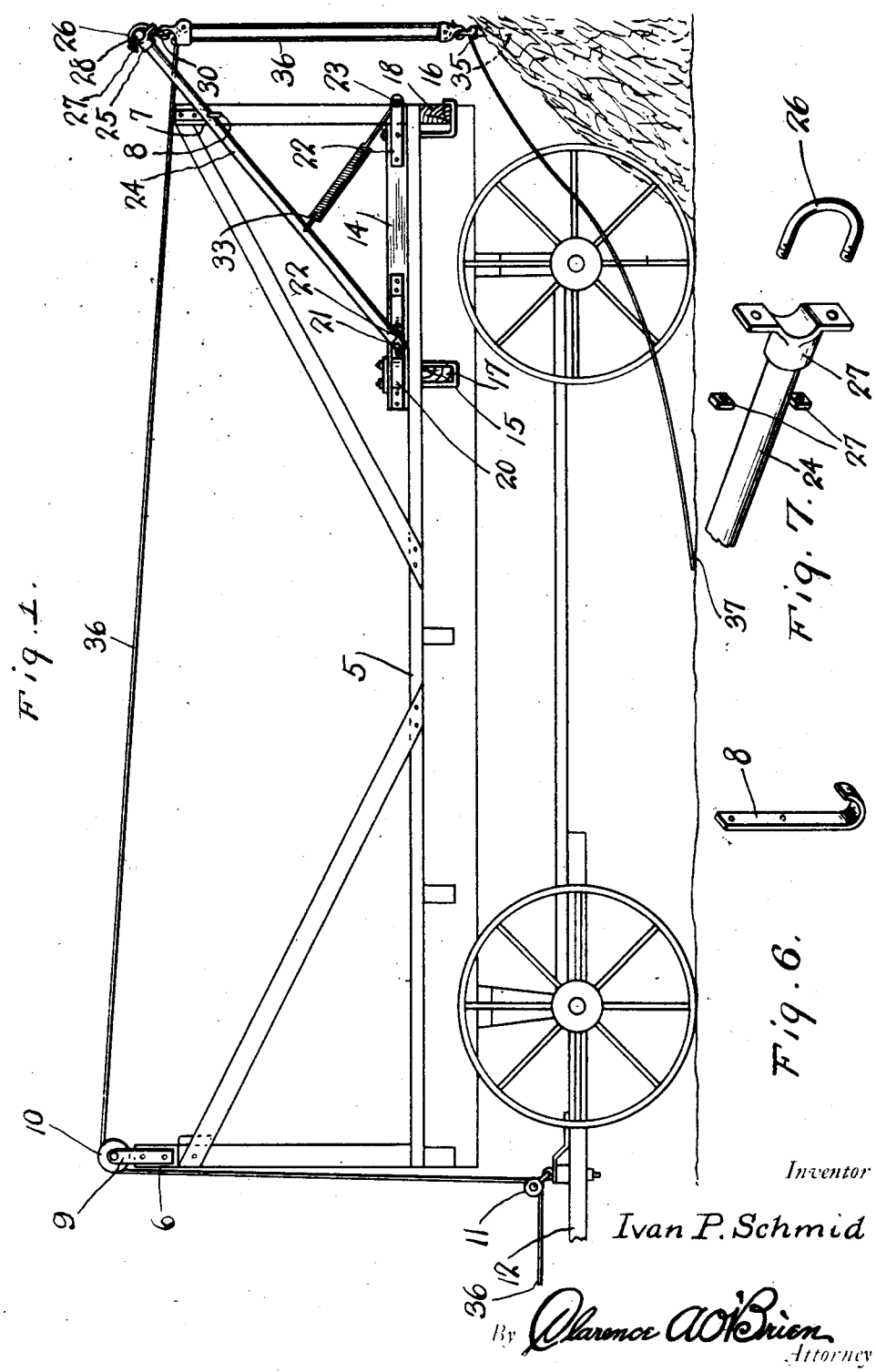

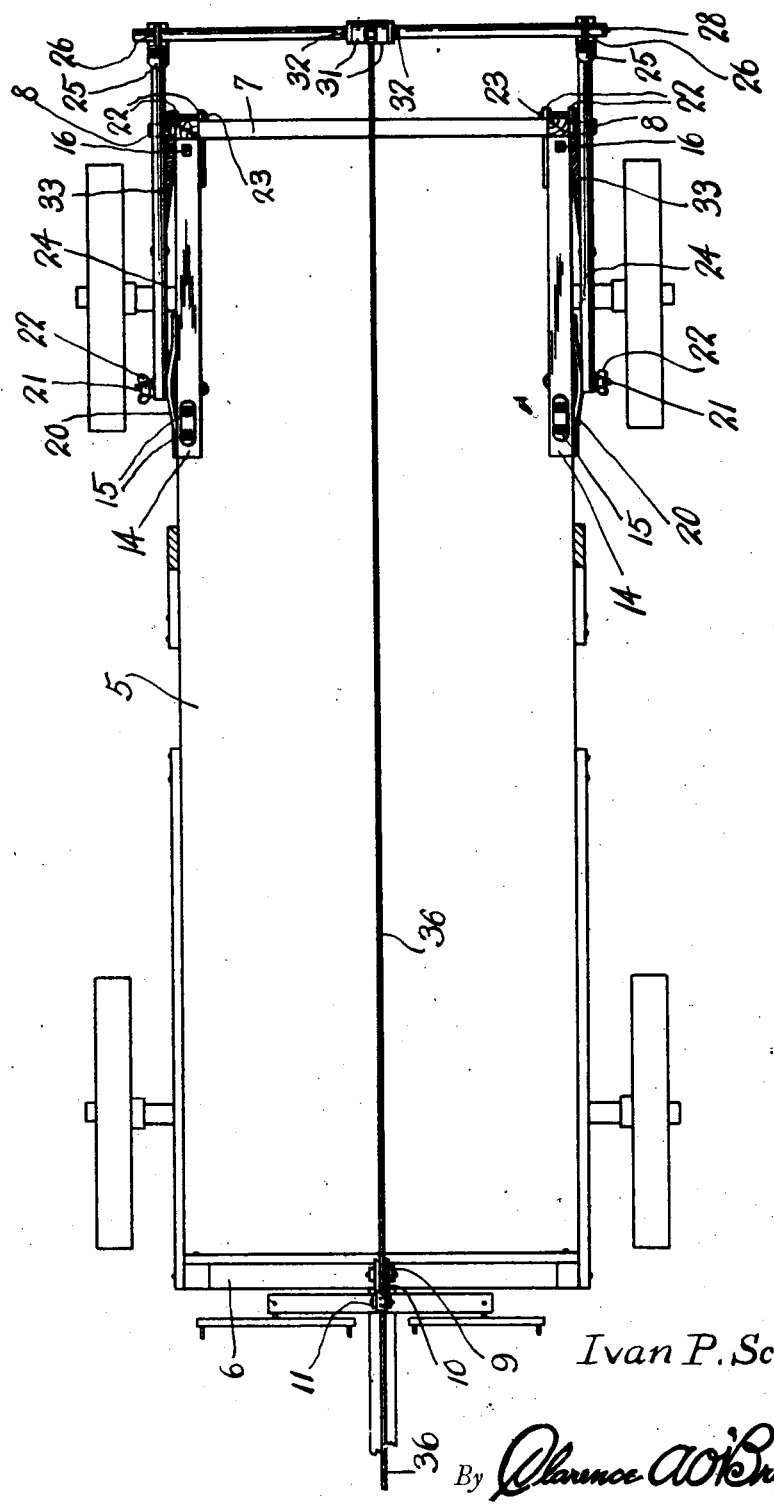

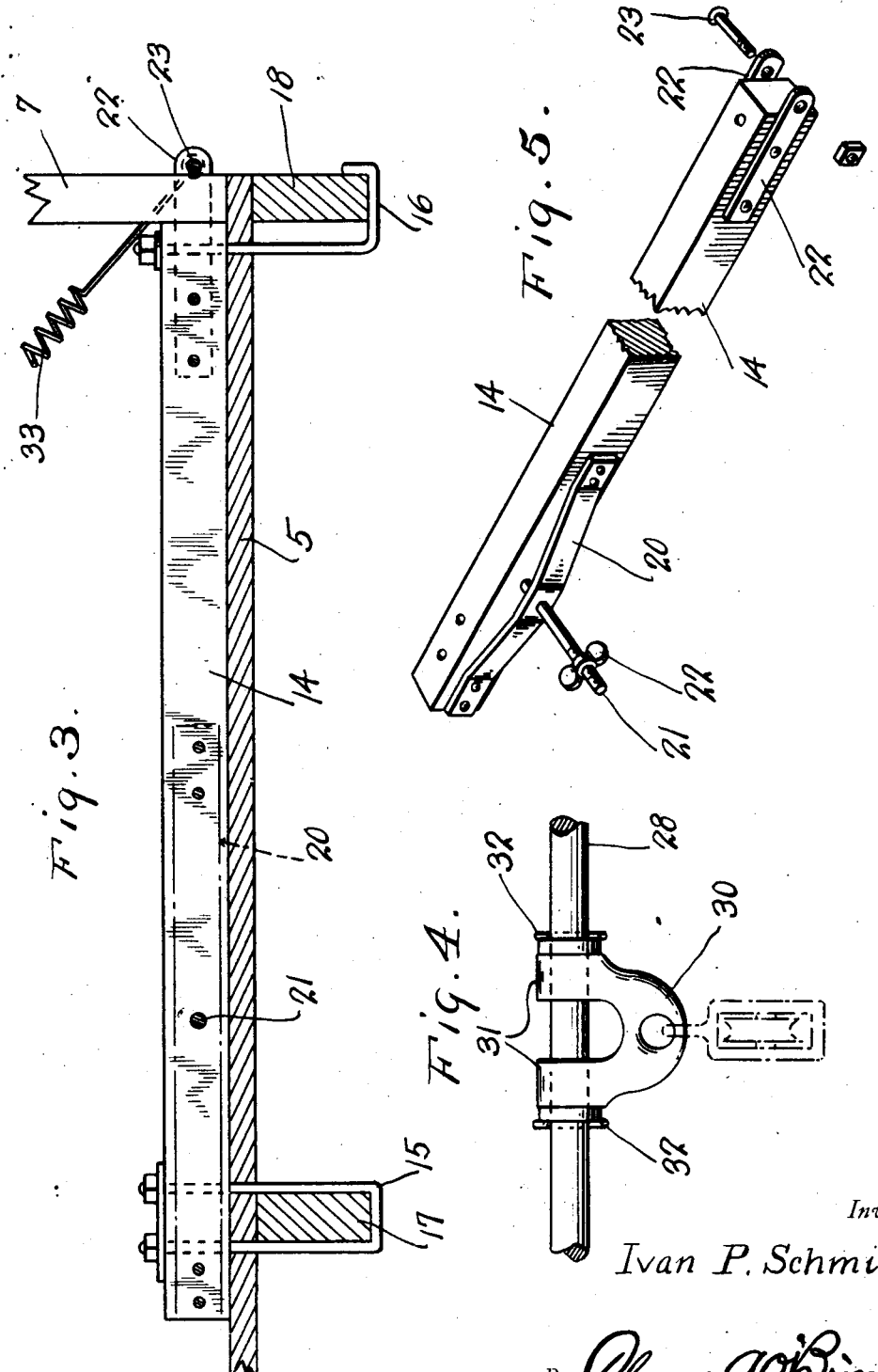

1,718,383

UNITED STATES PATENT OFFICE.

IVAN P. SCHMID, OF LEIGH, NEBRASKA.

HAY LOADER.

Application filed July 28, 1927. Serial No. 209,006.

The present invention relates to a hay loader and has for its prime object to provide a structure which may be mounted on a wagon and will enable the hay to be efficiently loaded on the wagon from a stack.

Another very important object of the invention resides in the provision of a hay loader with a pair of rockable members normally held by spring means extended over the rear of the wagon and block and fall means mounted thereon for lifting a hay fork a certain distance and the cable thereof then swinging the rockable member forwardly of the wagon so that the hay may be deposited thereon.

A still further very important object of the invention resides in the provision of a hay loader of this nature which is simple in its construction, strong and durable, convenient and easy to operate, thoroughly reliable in its operation, not likely to easily become out of order, and otherwise well adapted for the purpose for which it is designed.

With the above and numerous other objects in view as will appear as the description proceeds, the invention resides in certain novel features of construction, and in the combination and arrangement of parts as will be hereinafter more fully described and claimed.

In the drawings:—

Figure 1 is a side elevation of a hay wagon showing my hay loader mounted thereon, Figure 2 is a top plan view thereof, Figure 3 is an enlarged fragmentary longitudinal vertical section through the wagon showing one of the supporting beams, Figure 4 is a fragmentary detail of the cross rod, Figure 5 is a perspective view of one of the supporting beams, Figure 6 is a perspective view of one of the hooks, and, Figure 7 is a disassembled fragmentary perspective view of one of the rocker bars.

Referring to the drawing in detail it will be seen that the numeral 5 denotes a platform of a wheeled wagon of conventional construction which is provided with a front upright structure 6 and a rear upright structure 7. On the upper ends to the sides of the rear upright structure 7 there is mounted a pair of hooks 8. On the center of the forward upright structure 6 there is mounted a bracket 9 in which is journaled a pulley 10. A pulley 11 is mounted on the tongue structure 12. A pair of supporting beams 14 are mounted on the platform at the rear thereof and to the sides thereof being anchored in place by U-bolts 15 and a hook bolt 16 engaging cross beams 17 and 18 under the platform 5. On the rear outer side of each supporting beam 14 there is fixed an outwardly bowed spring 20 and a bolt 21 extends through the beam and through the center of the bowed spring 2 and has a thumb nut 22 thereon. The forward ends of the supporting beams 14 are provided with rearwardly extending straps 22 for receiving bolts 23 to their extremities to anchor the rear ends of the beams to the side members of the rear upright structure 7.

A pair of bars 24 have their ends rockable on the bolts 21. On the upper end of each rocker bar 24 there is mounted a yoke-structure 25 for receiving a U-member 26 held in place by nuts 27 so as to clamp a cross rod 28 thereto. A U-bracket 30 terminates in sleeve ends 31 which receive the center of the cross rod 28 being held in place by pins 32. Springs 33 are engaged with the bolts 23 and with intermediate portions of the rocker bar 24 so as to normally hold said rocker bars resting in the hooks 8 as is clearly shown in Figure 1. A block and fall structure is suspended from the U-bracket 30 and has a conventional hay fork 35 thereon. The cable 36 of the block and fall structure is trained over pulleys 10 and 11.

The operation of this apparatus is almost obvious from an inspection of the drawing in view of the detailed description just rendered. It will be noted that when the fork is engaged in the stack of hay as is shown in Figure 1, the cable 36 may be pulled until the block reaches the fall and further pulling of the cable will rock the bars 24 forwardly so that the hay being deposited on the center or forward portion of the platform 5 being released by suitable releasing cables 37. The springs 33 will return the bars 24 to engage in the hooks 8.

By tightening the nuts 22, the desired amount of friction may be placed on the bars 24, so that when the cable 36 is initially actuated, these bars will not swing. Furthermore, this friction can be regulated to prevent the springs 33 from swinging the bars 24 back against the stops 8 too quickly.

It is thought that the construction, operation, utility, and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:—

In combination, a platform, a pair of beams on the platform, means for fixing the beams to the platform, bowed springs on the sides of the beams, bolts extending through the beams and through the bowed springs, a pair of rods rockable on the bolts, nuts on the bolts to tighten the bars against the bowed springs, a cross rod between the extremities of the bars, and a block and fall structure suspended from the rod.

In testimony whereof I affix my signature.

IVAN P. SCHMID.